Figure 1:
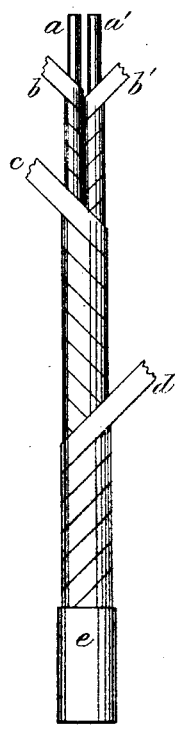

(No Model.)

H. C. SPALDING.
INSULATED CONDUCTOR.

No. 327,464. Patented Sept. 29, 1885.

WITNESSES
Aly. L. Hayes
Sanford H. Dudley

INVENTOR
Henry C. Spalding

UNITED STATES PATENT OFFICE.

HENRY C. SPALDING, OF BOSTON, MASSACHUSETTS.

INSULATED CONDUCTOR.

SPECIFICATION forming part of Letters Patent No. 327,464, dated September 29, 1885.

Application filed November 19, 1883. Renewed February 28, 1885. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Insulated Conductors, of which the following is a specification, reference being had to the drawings accompanying and forming a part of the same.

Electrical conductors have heretofore been made in which an insulated wire was surrounded by a metal sheath or jacket—in some cases insulated, in others not. In some instances the sheathing has been employed as a return-conductor, making, with the interior wire, a complete metallic circuit. When such conductors are used for the purposes of electrical communication in the vicinity of others similarly employed, it is well known that inductive influences from neighboring conductors are very greatly reduced. A conductor or cable thus constructed, however, presents many of the qualities and conditions of a condenser, with the result that rapid working over such a line is impeded by the retardation which is produced, particularly when the cable is laid on or under the surface of the earth.

With the double object of preventing induction from outside influences and retardation from the objectionable features of cables hitherto constructed, I have produced a cable consisting of two insulated conductors forming a round-wire circuit inclosed in an insulated sheathing or screen of metal. This cable I have found to give the most satisfactory results, which I attribute to the following reasons: When two wires are inclosed in the same metallic sheathing and used, respectively, as the leading and return conductors, the effect of the opposite polarities is to cancel or neutralize any inductive electrical disturbances in the sheath, producing in the same what may be termed an "electrical equilibrium." By this means not only is dynamic induction, but also retardation, due to electrostatic charge, prevented. If the sheathing be insulated so that it does not form a conductor or medium for the transmission of primary electrical currents, which it might otherwise receive from other conductors or receptive surface upon which an electrical charge might be collected from the earth, it is evident that the neutralizing effects of the currents in the interior wires will be much more complete, while the retarding effects of the earth charge is effectually prevented.

The invention is applicable to subterranean, submarine, or aerial lines, such changes or additions only being necessary to adapt it to the requirements of these several purposes as are now well understood.

Figure 2:
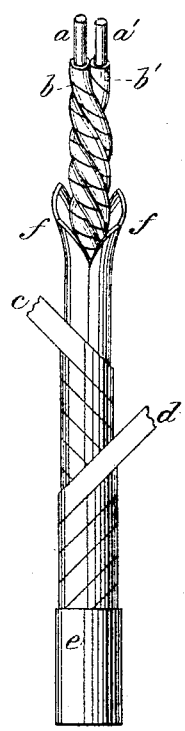

In the accompanying drawings I have illustrated a practicable and simple embodiment of the invention, Figures 1 and 2 being views of two cables of somewhat different construction with parts of the insulating material and metal sheaths removed for illustrating the plan of their construction.

In Fig. 1, $a$ $a'$ designate two parallel wires, both insulated preferably by strips of paper, $b$ $b'$, or other like material wound spirally around them. Around the wires is then applied a sheathing of metal, which I prefer to form by winding spirally around said wires a strip, $c$, of metal—such as tin-foil, copper, or the like. Over this, and in an opposite direction, is then wound a strip of paper, $d$, and, finally, the exterior coating, $e$, of the cable is applied. This latter may be of any suitable material. There is thus produced a conductor or cable in which two insulated wires are inclosed in an insulated sheath of metal, and in using the cable the two interior wires may be connected with opposite battery-terminals and constitute a round-wire circuit.

The wires $a$ $a'$, in lieu of being parallel, may be twisted together, as shown in Fig. 2. In such cases it is desirable, in order to obtain an even surface upon which to wind the metal strip $c$, to apply an intermediate layer of insulating material, $f$, which may be done in many well-known ways. This special feature, however, is not claimed herein, as it forms the subject of another application of even date herewith.

I am aware that insulated wires have been inclosed in lead tubes or pipes, and that single wires in insulated metal jackets have been used in the construction of cables; but these are matters foreign in their nature and purposes to my present invention, and are not claimed by me.

What I claim is—

1. In a cable, the combination, with two insulated conductors forming a complete metallic or round-wire circuit, of an insulated metallic sheath or jacket inclosing said conductors, as set forth.

2. A cable composed of two conductors forming a complete or round-wire circuit and insulated by a covering of paper and an insulated metal sheath inclosing or surrounding the two conductors, as and for the purpose set forth.

3. A cable composed of two conductors insulated by a covering of paper, a metallic sheath around said conductors, and a paper covering around the sheath, substantially as herein set forth.

In witness whereof I have hereunto signed my name in presence of the two subscribing witnesses.

HENRY C. SPALDING.

Witnesses:
   ALEX. L. HAYES,
   S. H. DUDLEY.